Nov. 12, 1929.  E. W. DAVIS ET AL  1,735,734
LUBRICATING APPARATUS
Filed March 30, 1927    2 Sheets-Sheet 1

Inventors:
Ernest W. Davis
Leonard H. Wheeler
By Williams, Bradbury,
McCaleb & Hinkle
Attys.

Nov. 12, 1929. E. W. DAVIS ET AL 1,735,734
LUBRICATING APPARATUS
Filed March 30, 1927  2 Sheets-Sheet 2

Inventors
Ernest W. Davis
Leonard H. Wheeler
By Williams, Bradbury,
McCaleb & Hinkle
Attys.

Patented Nov. 12, 1929

1,735,734

UNITED STATES PATENT OFFICE

ERNEST W. DAVIS, OF OAK PARK, AND LEONARD H. WHEELER, OF CHICAGO, ILLINOIS, ASSIGNORS TO ALEMITE CORPORATION, OF CHICAGO, ILLINOIS, A CORPORATION OF DELAWARE

LUBRICATING APPARATUS

Application filed March 30, 1927. Serial No. 179,423.

Our invention relates to lubricating apparatus and has for one of its objects the provision of an improved inertia operated lubricant pump.

A second object is to provide an improved pump of this type in which means are provided to prevent the lubricant from impeding the oscillation of the inertia weight.

A third object is to provide improved means for adjusting the throw of the inertia weight used to operate the pump.

A fourth object is to provide an improved tank construction whereby the tank may be easily filled and the operating mechanism readily removed.

A fifth object is to provide an inertia operated pump which may be readily assembled and economically manufactured.

Other objects will appear from the following description, reference being had to the accompanying drawings in which—

The pump of our invention is adapted to be used in centralized systems of chassis lubrication such as disclosed in the co-pending application of Ernest W. Davis, Serial No. 74,424, filed December 9, 1925, although it may be advantageously employed in other fields of lubrication.

Figure 1:
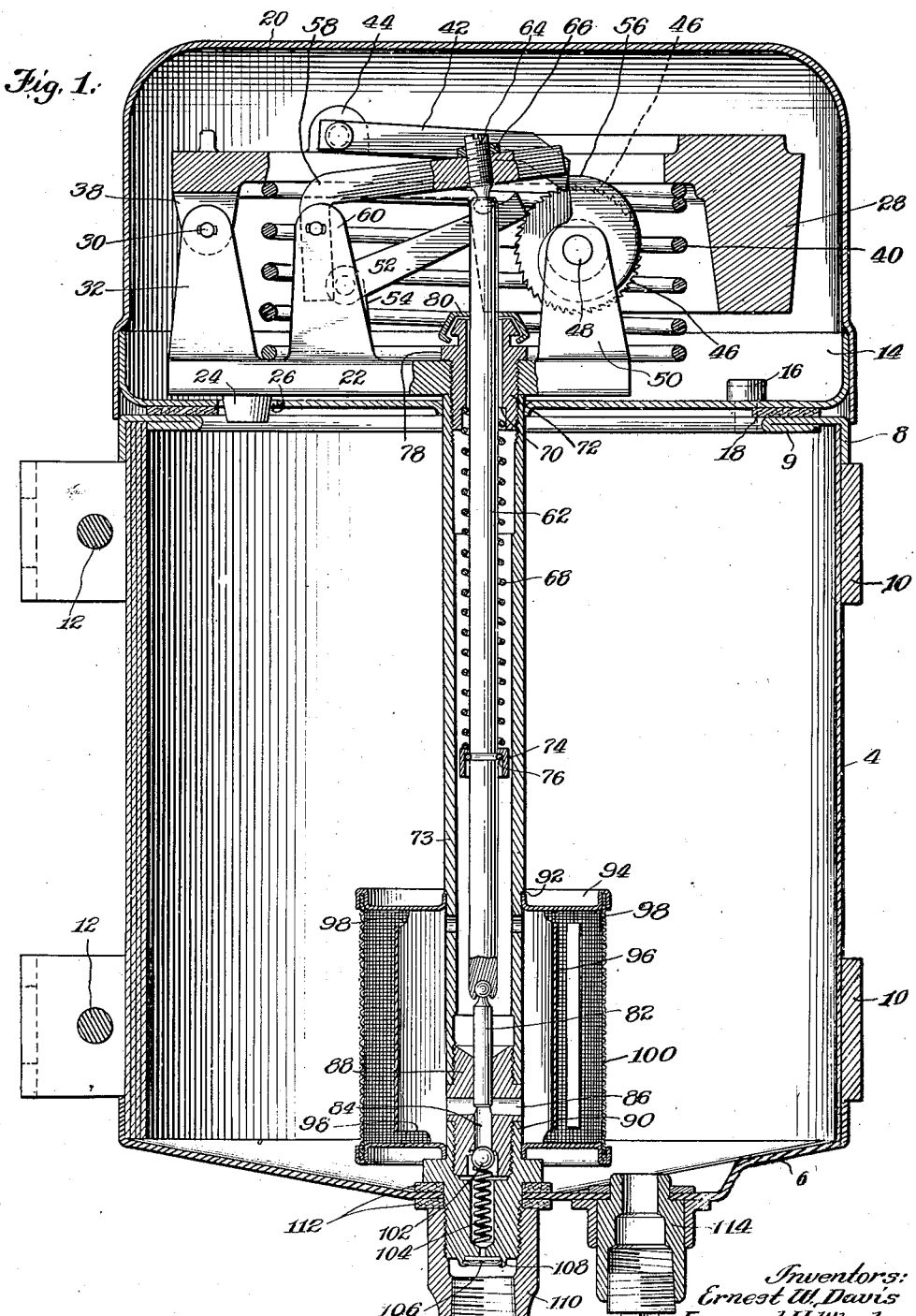
Fig. 1 is a vertical cross-sectional view taken on the line 1—1 of Fig. 2.

The lubricant is contained in a cylindrical tank comprising a side wall 4, a bottom 6, and an inwardly flanged top ring 8. The bottom 6 and the flanged ring 8 are preferably secured to the side wall 4 by welding. The ring 8 is bent back on itself as shown in Fig. 1 to increase its strength. The tank may be secured to any desired part of the automobile by means of a pair of clamping rings 10, the ends of which are adapted to be drawn together by bolts 12.

The operating mechanism is supported above an upwardly flanged plate 14 which rests upon the flanged ring 9 and is secured thereto by suitable cap screws 16, a gasket 18 of any suitable material being interposed between these members to effect a lubricant-tight seal. A filling aperture 15 in the plate 14 may, as shown, be provided with a screen 17, although ordinarily it is unnecessary. A cover 20 fits over the flanged plate 14, and if desired may be removably secured thereto by a pin and open slot connection or any other well known expedient. A base casting 22 is held above the flanged plate 14 and has a lug 24 projecting downwardly into a registering aperture 26 in the plate 14, to align and prevent relative rotation between the operating mechanism and the tank.

Figure 2:
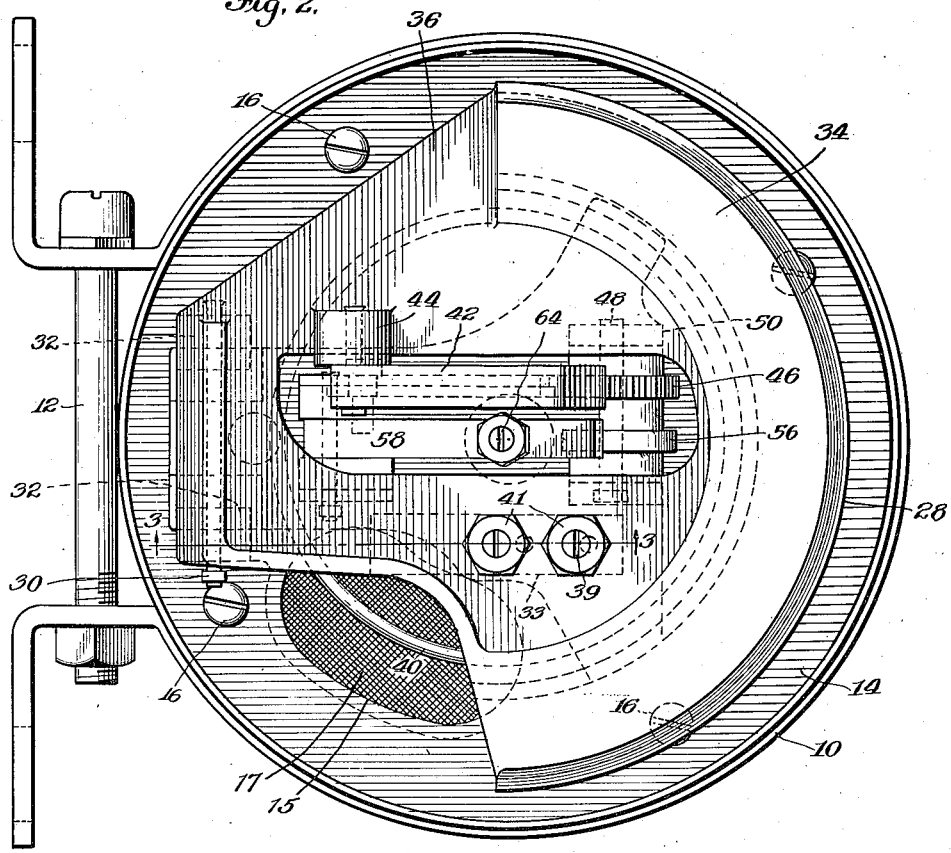
Fig. 2 is a plan view of the device having the cover removed so as to more clearly show the operating mechanism.

The power for actuating the pump is supplied by an inertia operated weight 28 which is pivotally mounted on a pin 30 carried by a pair of standards 32 which are integral with the base casting 22. As best shown in Fig. 2 the weight comprises an arcuate portion 34 connected by a webbed portion 36 to the downwardly projecting bearing lugs 38. A helical spring 40 is slightly compressed between the base casting 22 and the lower surface of the web 36. This spring has sufficient resiliency to permit the oscillation of the weight 28 about its pivot 30 through angle of from approximately 10° to 15°, when the tank is slightly shaken. The mechanism is so sensitive that it will operate when the automobile upon which it is carried is being driven upon car tracks.

Figure 3:
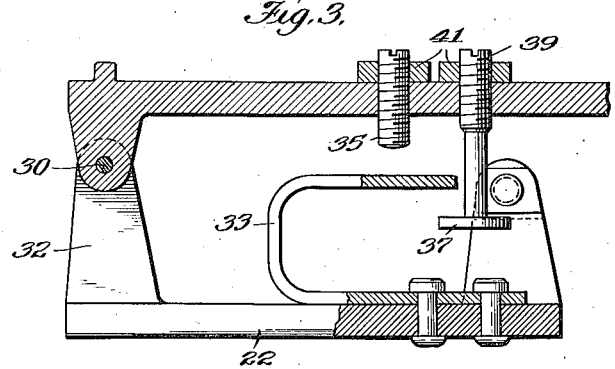
Fig. 3 is a detail sectional view of the means used to adjustably limit the throw of the inertia operated weight.

The extent of oscillation of the weight 34 may be adjustably controlled by a device which is best shown in Fig. 3. A semi-resilient U-shaped bar 33 has one arm thereof secured to the base casting 22, the other arm thereof providing a stop which is adapted to be engaged by the lower end of a set screw 35 to limit the downward movement of the weight, and by the head 37, formed integral with the screw 39, to limit the upward movement of the weight. The screws 35 and 39 may be readily adjusted, being locked in adjusted position by nuts 41.

A pawl arm 42 is pivotally connected to a lug 44 on the web 36 and is adapted to engage the teeth of a ratchet wheel 46 which is secured to a shaft 48. The shaft 48 is rotatable in a pair of brackets 50 formed integrally with the base casting 22. A dog 52 pivotally mounted between a pair of brackets 54 is adapted to prevent retrograde movement of the ratchet wheel 46.

The shaft 48 has a cam 56 secured thereto. This cam has a slow rise and a sudden fall. A lever 58 pivotally mounted between a pair of supports 60 is adapted to have its end ride upon the surface of the cam 56 and will thereby be given an oscillatory movement. This arm is universally and adjustably connected to the piston rod 62 by means of a screw 64 which at its end has a ball fitting into a socket in the end of the piston rod 62. The screw 64 may be readily adjusted and then locked in adjusted position by a nut 66. The piston rod is normally urged downwardly by a spring 68 seating between a shoulder 70 formed in a plug 72 and a collar 74 which is held against downward movement by a split ring 76 fitting in an annular groove in the piston rod 62. The plug 72 is threaded in the base casting 22 and has a shoulder portion 78 which is adapted to receive a wrench. A protecting cover plate 80 is apertured to receive the piston rod 62 and is adapted to snap over suitable projections formed at the upper end of the plug 72.

From this description it will be seen that slight shaking of the apparatus will cause the oscillation of the weight 28. This motion is transformed into rotative movement of the cam 56 through the pawl and ratchet mechanism. Rotation of the cam raises the arm 58 and hence the piston rod 62 until the cam is in position such as shown in Fig. 1, when the point of sudden fall on the cam reaches the end of the arm 58 and permits the latter with the piston rod 62, to be forced downwardly under the influence of the spring 68.

The lower end of the piston rod 62 is connected to a piston or plunger 82, slidable in its cylinder 84. Suitable inlet apertures 86 are formed in the cylinder body 88 at the upper end of the cylinder. The clearance between the plunger 82 and the cylinder 84 is sufficient to permit slight leakage of the lubricant past the plunger during its slow up stroke, but is not great enough to permit appreciable leakage during the sudden downward stroke. The cylinder body 88 is threaded at both ends, one end screwing into the lower end of the tube 73 and the other end being threaded in a member 90.

An oil filtering device is clamped between a shoulder 92 formed on the tube 73 and an enlarged portion of the member 90. This device comprises a pair of heads 94 which are separated by a sheet 96 bent so as to be triangular in cross-section. The corners of this plate are cut away as shown at 98 to provide passages for the lubricant. A wire mesh strainer 100 is secured between the bent back portions of the peripheral edges of the heads 94. The heads 94, plate 96 and the wire mesh element 100 thus form a rigid unit, having a large filtering area, which is positioned so as to strain the impurities from the lubricant before it reaches the pump.

A ball check valve 102 is pressed upwardly by a spring 104 so as normally to close the lower end of the cylinder 84. The member 90 has an axial bore which is somewhat restricted at its lower end to form a seat for a check valve which is carried in a perforated cage 106 secured to the member by striking over an annular ridge 108 formed at the lower end of the same. The details of the check valve contained within the cage 106 are shown and described in the above mentioned co-pending application of Ernest W. Davis. The requisite for this valve is that it operate under very slight changes in pressure and that it form a substantially perfect closure. A coupling 110, threaded over the lower end of the member 90, is adapted to clamp the latter to the bottom 6 of the tank, a pair of gaskets 112 being provided to insure a fluid-tight connection. It will therefore appear that the operating mechanism, with the plate 14, may be removed from the tank as a unit by unscrewing the coupling 110, and removing the screws 16.

A suitable fitting 114 closed by a plug 116 is provided to permit the tank to be easily and quickly drained.

It will be noted that the cylinder, piston, piston rod, and the actuating mechanism form a unit which is supported by the bottom of the tank. This construction makes it possible to assemble, and, if necessary, adjust all of the mechanism prior to insertion in the tank. The lubricant in the tank cannot splash up against the weight, nor can the tank be filled to a height sufficient to submerge the weight, and thus the possibility of the oscillating movement of the weight being impeded by the lubricant is eliminated.

As above described, the oscillating movement of the weight is transformed into reciprocatory movement of the plunger stem 62. The plunger thus forces the lubricant from cylinder 84 past the check valves 108 and 106 to the bearings upon the downward stroke and upon the return stroke creates a partial vacuum in cylinder 84. The cylinder is refilled with lubricant partly by leakage between plunger and the cylinder walls and partly by lubricant entering as soon as the ports 86 are uncovered at the end of the return stroke of the plunger. The amount of lubricant supplied to the bearings may be governed by increasing the effective length of the stroke of the piston by means of the screw 64.

While we have shown and described a particular embodiment of our invention, it will be apparent to those skilled in the art that slight variations may be made without departure from the principles of our invention. We therefore do not wish to limit ourselves to the particular embodiment shown but desire the scope of our invention to be limited only by the claims which follow.

We claim:

1. In a device of the class described, the combination of a lubricant supply tank having an inwardly projecting top flange, a plate removably secured to said flange, an inertia operated pump actuating mechanism positioned above and held against rotation by said plate and having a support extending through said plate and through the bottom of said tank, means external of the tank for securing said support to the bottom of said tank, and a cover fitting over said pump mechanism and engaging said plate, whereby upon release of said means and removal of said cover, said mechanism may be removed as a unit from said tank.

2. Lubricating apparatus comprising a lubricant supply tank, a discharge fitting secured at the bottom of said tank, a pump cylinder threaded in said discharge fitting, a tube supported by said cylinder, a plunger in said cylinder, a stem universally connected to said plunger and extending upwardly through said tube, inertia operated mechanism supported at the top of said tube and operatively connected to said stem, and a plate across the top of said tank having means to prevent rotation of said mechanism, said plate being adapted to prevent lubricant from splashing upwardly from said tank and thereby impeding the operation of said mechanism.

3. In a device of the class described, the combination of a base, an inertia operated weight pivotally supported thereby, a semi-resilient bar having one end portion extending parallel to said base casting and spaced therefrom, an adjustable screw threaded in said weight and adapted to abut against the upper surface of the end portion of said bar to limit the downward movement of said weight, and a headed screw adjustably threaded in said weight, the head thereof projecting beneath the end of said bar so as to limit the upward movement of said weight.

4. Lubricating apparatus comprising an open-end lubricant supply tank, a pump for forcing lubricant from said tank, inertia operating mechanism for said pump positioned above said tank, a baffle plate at the top of said tank to prevent lubricant from splashing upwardly against said mechanism, said plate having a filling opening therein, and a cover secured to said plate, fitting over and around said mechanism, and closing the top of the tank.

5. Lubricating apparatus comprising a lubricant supply tank, inertia operated pumping mechanism extending into said tank and supported by the bottom thereof, an apertured plate secured over the top of said tank, and means rigid with said mechanism and projecting through said aperture for preventing rotative movement of said mechanism with respect to said tank.

6. Lubricating apparatus comprising a lubricant supply tank, an apertured plate secured over the top of said tank, a base supporting an inertia operated actuating mechanism, a pump device actuated thereby and secured to the bottom of said tank said device having a tubular element threaded to said base, and cooperative means on said plate and base for preventing rotative movement of said base relative to said tank.

7. Lubricating apparatus comprising a lubricant supply tank, an apertured plate secured over the top of said tank, a base supporting an inertia operated actuating mechanism, a pump device actuated thereby and secured to the bottom of said tank said device having a tubular element threaded to said base, and means for preventing rotative movement of said base relative to said tank comprising a lug depending from said base into an aperture formed in said plate.

8. Lubricating apparatus comprising a lubricant supply tank, a plate having a filling aperture secured at the top of said tank, an outlet fitting in the bottom of said tank, said fitting having an upwardly facing shoulder within said tank, a tubular element threaded to said outlet fitting and having a downwardly facing shoulder, and a filter comprising a pair of spaced heads, one of said heads fitting around said tubular element and abutting against the shoulder thereon, the other head fitting around said outlet fitting and resting upon upwardly facing shoulder thereof, a strainer element secured between said heads, and a rigid separator confined between and holding said heads in spaced relation.

9. Lubricating apparatus comprising a lubricant supply tank, a plate having a filling aperture secured at the top of said tank, an outlet fitting in the bottom of said tank, said fitting having an upwardly facing shoulder within said tank, a tubular element threaded to said outlet fitting and having a downwardly facing shoulder, and a filter comprising a pair of spaced heads, one of said heads fitting around said tubular element and abutting against the shoulder thereon, the other head fitting around said outlet fitting and resting upon upwardly facing shoulder thereof, a strainer element secured between said heads, and an apertured plate bent to form a hollow triangular prism positioned between and holding said heads in spaced relation.

10. Lubricating apparatus comprising a lubricant supply tank having a pump supported therein, an inertia actuated weight, pump operating mechanism driven thereby, an apertured plate secured over the top of said tank, said plate having a peripheral flange extending upwardly to a level below the inertia operated weight, thereby preventing said tank from being filled with lubricant to a height sufficient to interefere with the operation of said weight, and a cover enclosing said weight and mechanism and engaging said flange.

11. A lubricant supply device comprising a cylindrical container, a partition removably mounted on the top of said container, an inertia actuated power plant mounted above said partition, a pump at the center of the bottom of said container, a central pitman connecting said power plant and pump, a foraminated tube housing said pitman, a filter element telescoped over said tube and covering the foraminations therein, said pump and power plant being rigidly secured to opposite ends of said tube, a peripheral flange on said partition forming a cup for receiving lubricant, said flange ending at a level below that at which lubricant would interfere with the operation of said power plant, and a detachable dome-shaped cover telescoped over said flange.

12. A lubricant supply device comprising a container, a partition in said container, an inertia actuated power plant mounted above said partition, a pump at the bottom of said container, a pitman connecting said power plant and pump, tubular means housing said pitman, and a peripheral upwardly extending flange on said partition forming a cup for receiving lubricant, the upper edge of said flange being lower than the level at which the presence of lubricant would interfere with the operation of said power plant, and an inverted cup-shaped cover for said power plant telescoped over said flange.

In witness whereof, we hereunto subscribe our names this 23 day of March, 1927.

ERNEST W. DAVIS.
LEONARD H. WHEELER.